US012325151B2

(12) United States Patent
Kitamura et al.

(10) Patent No.: US 12,325,151 B2
(45) Date of Patent: Jun. 10, 2025

(54) METHOD AND DEVICE FOR PRODUCING CONCRETE PILE

(71) Applicant: GIKEN LTD., Kochi (JP)

(72) Inventors: Akio Kitamura, Kochi (JP); Hiroaki Tanouchi, Kochi (JP); Shinya Nakazawa, Kochi (JP); Masaaki Ono, Kochi (JP)

(73) Assignee: GIKEN LTD., Kochi (JP)

( * ) Notice: Subject to any disclaimer, the term of this patent is extended or adjusted under 35 U.S.C. 154(b) by 459 days.

(21) Appl. No.: 17/621,018

(22) PCT Filed: Jun. 19, 2020

(86) PCT No.: PCT/JP2020/024254
§ 371 (c)(1),
(2) Date: Dec. 20, 2021

(87) PCT Pub. No.: WO2020/256141
PCT Pub. Date: Dec. 24, 2020

(65) Prior Publication Data

US 2022/0362967 A1 Nov. 17, 2022

(30) Foreign Application Priority Data

Jun. 20, 2019 (JP) ................................ 2019-114785

(51) Int. Cl.
*B28B 21/82* (2006.01)
*B28B 7/46* (2006.01)
(Continued)

(52) U.S. Cl.
CPC ................ *B28B 21/82* (2013.01); *B28B 7/46* (2013.01); *B28B 21/88* (2013.01); *B28B 23/06* (2013.01);
(Continued)

(58) Field of Classification Search
CPC ......... B28B 23/06; B28B 21/10; B28B 21/18; B28B 21/82; B28B 7/46; B28B 21/88;
(Continued)

(56) References Cited

U.S. PATENT DOCUMENTS 1,756,146 A * 4/1930 Addison ................ B28B 7/241
249/141

FOREIGN PATENT DOCUMENTS

CN 108544644 A 9/2018
FR 2314810 A1 * 1/1977
(Continued)

OTHER PUBLICATIONS

Kitamura Machine Translation, generated Nov. 22, 2023 (Year: 2015).*
(Continued)

*Primary Examiner* — Andrew L Swanson
(74) *Attorney, Agent, or Firm* — Oliff PLC

(57) ABSTRACT

A manufacturing method of a concrete pile is shown. The method includes the following, that is, pouring concrete in the pile molding space, reducing the pile molding space to compress and mold the concrete, draining water drained from the concrete by compression and molding outside of the formwork from the drainage hole, and holding the concrete a predetermined amount of time to harden the concrete. The formwork includes an outer formwork that molds an outer wall surface of the concrete pile, an inner formwork that molds an inner wall surface of a hollow space of the concrete pile, and a pair of end formwork that mold upper and lower end surfaces of the concrete pile. The drainage hole is a gap between adjacent components when
(Continued)

the mold is tightened, and the gap is configured to be capable of being opened larger during cleaning than when the mold is tightened.

4 Claims, 14 Drawing Sheets

(51) Int. Cl.
*B28B 21/88* (2006.01)
*B28B 23/06* (2006.01)
*E02D 5/30* (2006.01)

(52) U.S. Cl.
CPC ........ *E02D 5/30* (2013.01); *E02D 2250/0007* (2013.01); *E02D 2250/0023* (2013.01); *E02D 2250/0046* (2013.01); *E02D 2300/002* (2013.01); *E02D 2300/0032* (2013.01); *E02D 2300/0034* (2013.01)

(58) Field of Classification Search
CPC ... B28B 7/344; E02D 5/30; E02D 2250/0007; E02D 2250/0023; E02D 2250/0046; E02D 2300/002; E02D 2300/003; E02D 2300/0034; E02D 2250/00; E02D 2250/0061; E02D 2250/0069; E02D 2250/0076
See application file for complete search history.

(56) References Cited

FOREIGN PATENT DOCUMENTS

| | | | | |
|---|---|---|---|---|
| GB | 1 434 734 | A | | 5/1976 |
| JP | S62-256604 | A | | 11/1987 |
| JP | H2-64007 | U1 | | 5/1990 |
| JP | 2015142966 | A | * | 8/2015 |
| KR | 20000056874 | A | * | 9/2000 |

OTHER PUBLICATIONS

Soo (KR20000056874A), Translation, Sep. 15, 2000 (generated May 6, 2024), Espacenet (Year: 2000).*
Assainissement (FR2314810A1), Translation, Jan. 14, 1977 (generated May 6, 2024), Espacenet (Year: 1977).*
Feb. 14, 2023 Office Action issued in Chinese Patent Application No. 202080044311.1.
Aug. 11, 2023 Office Action issued in Chinese Patent Application No. 202080044311.1.
Aug. 18, 2020 International Search Report issued in International Patent Application No. PCT/JP2020/024254.
Aug. 31, 2021 Japanese Office Action issued in Japanese Patent Application No. 2021-526949.
Dec. 21, 2021 International Preliminary Report issued in International Application No. PCT/JP2020/024254.

* cited by examiner

METHOD AND DEVICE FOR PRODUCING CONCRETE PILE

TECHNICAL FIELD

The present invention relates to a method and device for manufacturing a concrete pile.

BACKGROUND ART

As a technique to manufacture a concrete pile with low costs and low noise, instead of using a large centrifugal force molding device, patent document 1 describes a technique in which a molding space is reduced to compress and mold concrete.

Patent document 1 describes positioning a member including a permeable material such as hard urethane in a formwork and forming a storage space for drained water from the concrete being compressed and molded.

CITATION LIST

Patent Literature

Patent Document 1: JP 2015-142966

SUMMARY OF INVENTION

Technical Problem

According to the above conventional technique, part of a molded surface may include permeable material such as hard urethane, but the shape is deformed by pressure added when the concrete is compressed and molded. Therefore, it is difficult to mold the concrete pile with accurate dimensions. Wien the pressure in compression and molding is suppressed to be low in order to suppress the deforming, it is not possible to increase strength of the concrete pile.

The drained water from the concrete is held within a water holding capacity of the permeable material such as hard urethane positioned in the formwork, and the draining of water from the concrete may not be sufficient. Therefore, it is difficult to manufacture the concrete pile to have a desired moisture percentage and desired strength.

The present invention is conceived in view of the above problems, and the purpose of the present invention is to manufacture a concrete pile with low costs, low noise, high water draining efficiency, high quality, and large strength.

Solution to Problem

According to an aspect of the present invention, a manufacturing method of a concrete pile that uses a formwork in which a drainage hole connected to outside is provided on a molding surface and in which a pile molding space can be reduced and enlarged, the method includes: pouring concrete in the pile molding space, reducing the pile molding space to compress and mold the concrete, draining water drained from the concrete by compression and molding outside of the formwork from the drainage hole, and holding the concrete a predetermined amount of time to harden the concrete.

According to another aspect of the present invention, a manufacturing device of a concrete pile includes: a formwork that compresses and molds the concrete pile, and a drainage hole that is provided in a molding surface of the formwork and that is connected to outside, wherein, the formwork is configured to be capable of reducing and enlarging a pile molding space and the concrete pile is compressed and molded.

Advantageous Effects of Invention

According to the method for manufacturing the concrete pile according to one embodiment of the present invention, the concrete pile can be manufactured with low cost, low noise, high accuracy and large strength.

According to the manufacturing device of the concrete pile according to one embodiment of the present invention, the concrete pile can be manufactured with low cost, low noise, high accuracy and large strength without using a large device other than a formwork.

DESCRIPTION OF EMBODIMENTS

An embodiment of the present invention is described with reference to the drawings. The embodiments of the present invention described below do not limit the present invention.

Outline of Embodiment 1

Device Configuration

Figure 1A:
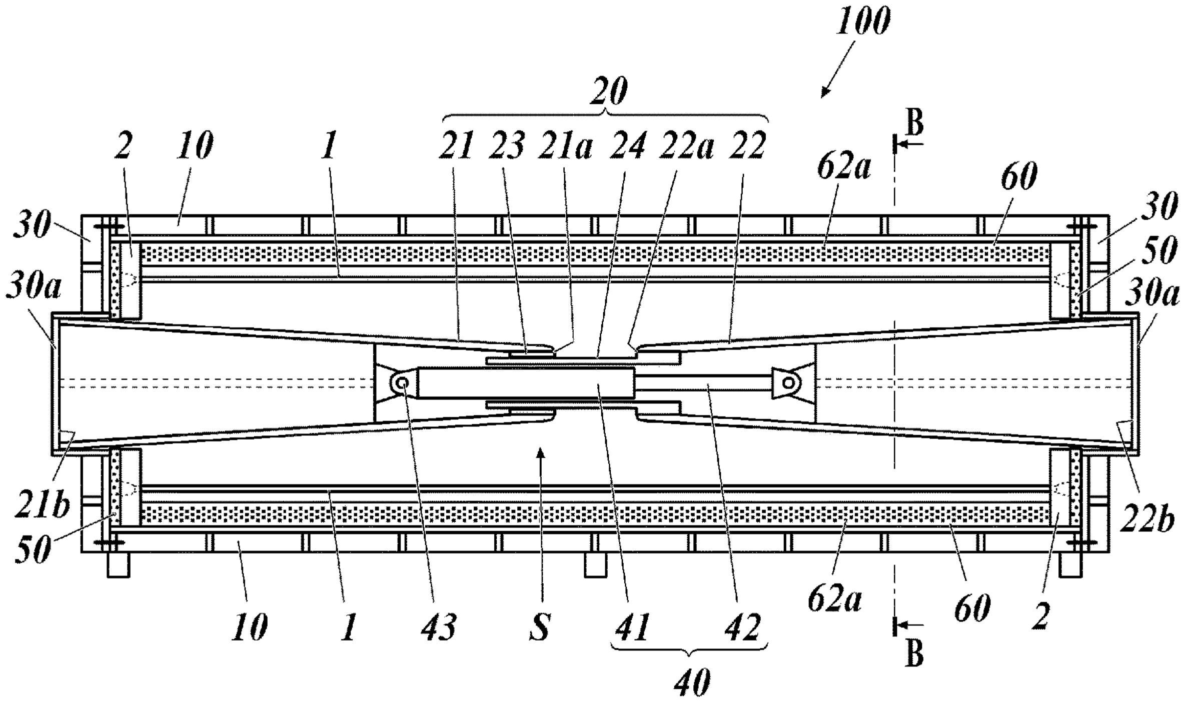
FIG. 1A is a cross sectional view in an axis direction showing a manufacturing device of a concrete pile according to an embodiment of the present invention.
Figure 1B:
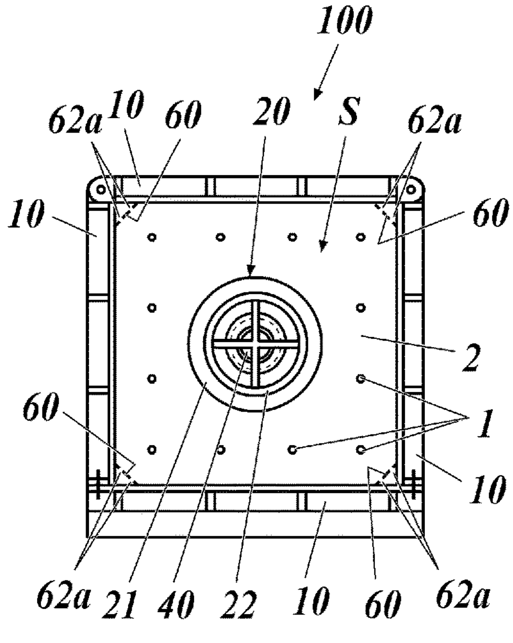
FIG. 1B is a cross sectional view along line B-B shown in FIG. 1A.

As shown in FIG. 1A and FIG. 1B, a concrete pile manufacturing device 100 according to the present embodiment includes an outer formwork main body 10 assembled in a substantial rectangular cylindrical shape, an inner formwork 20 positioned inside the outer formwork main body 10, an end formwork 30 which closes openings at both ends of the outer formwork main body 10, and the like.

The outer formwork main body 10 is assembled so that a steel bar 1 extending in a predetermined direction and a pair of metal joints 2 fixed to both ends of the steel bar 1 can be stored inside.

For example, the steel bar 1 is a prestressed concrete steel bar (PC steel bar) and is a core material which strengthens a concrete pile. That is, the steel bar 1 is a strengthening material and is a tension material in order to introduce prestressing. As tension material, other material such as a PC steel wire, a PC steel stranded wire, carbon fiber tension material, and the like may be applied.

The metal joint 2 is a steel plate shaped member in which an opening is formed on a center side, and is a member that is a joint end plate of the concrete pile.

Both ends of the steel bar 1 are fixed to the metal joint 2 by fixing tools such as bolts, and the steel bar 1 is formed as one with a pair of petal joints 2. According to the present embodiment, there are 12 steel bars 1 crossed over between a pair of metal joints 2.

The inner formwork 20 includes a tapered surface with a diameter reducing toward tips 21*a*, 22*a* along a direction in which the steel bar 1 stored in the outer formwork main body 10 extends (axis direction of steel bar 1). The inner formwork 20 includes a pair of cores 21 and 22 which are positioned so that the tips face each other.

An opening 23 is provided on the tip 21*a* side of one core 21, and a projecting portion 24 inserted through the opening 23 is provided on the tip 22*a* side of the other core 22.

The opening 23 provided in the tip 21*a* of the core 21 is a cylindrical member and includes a size so that the projecting portion 24 slides against the inner surface.

The projecting portion 24 provided at the tip 22*a* of the core 22 is a cylindrical member extending along an axis direction of the steel bar 1, and includes a shape which can move in a tube axial direction while the outer surface slides against the opening 23. A considerable length is provided for the sliding surfaces in each of the cores 21, 22 so as to prevent sagging of the inner formwork 20.

Therefore, in a state with the inner formwork 20 provided in the outer formwork main body 10, a pile molding space S is formed in order to insert concrete between the tapered surface of the inner formwork 20 and the outer formwork main body 10.

The pair of cores 21, 22 of the inner formwork 20 include a hollow portion inside, and a cylinder device 40 which is a means for moving the cores 21, 22 along an axis direction of the steel bar 1 is provided in the hollow portion.

The cylinder device 40 is a double acting hydraulic cylinder and includes a cylinder tube 41 and a piston rod 42. The cylinder tube 41 is linked to one core 21, and the piston rod 42 is linked to the of the core 22. Specifically, the cylinder tube 41 is linked to the core 21 through a linking pin 43 which opens and closes by remote control in order to be able to switch the state of attachment and detachment.

By operating this cylinder device 40 in order to advance and retreat the piston rod 42 with relation to the cylinder tube 41, the tip 21*a* of one core 21 can be placed close or can be separated from the tip 22*a* of the other core 22. Since the pair of cores 21, 22 are brought close to each other or are separated from each other by the cylinder device 40, the pair of cores 21, 22 are able to slide so that the opening 23 provided in the tip 21*a* of one core 21 and the projecting portion 24 provided in the tip 22*a* of the other core 22 slide against each other and move.

The end formwork 30 is provided at both ends of the outer formwork main body 10 in the longitudinal direction.

The end formwork 30 is provided with a concave portion 30*a* which slidably supports rear ends 21*b*, 22*b* of the cores 21, 22 included in the inner formwork 20.

A cushioning material 50 with elasticity is provided on an inner surface of the end formwork 30, and the pair of joint metals 2 fixed to both ends of the steel bar 1 stored in the outer formwork main body 10 comes into contact with the end formwork 30 through the cushioning material 50. The cushioning material 50 is a plate shaped member such as styrene foam or hard sponge, and is formed with an opening on the center side similar to the metal joints 2.

Outer formwork drains 60 are positioned in the four corners in the outer formwork main body 10. The outer formwork main body 10 and the outer formwork drain 60 combined correspond to the outer formwork which mold an outer wall surface of the concrete pile.

Figure 3:
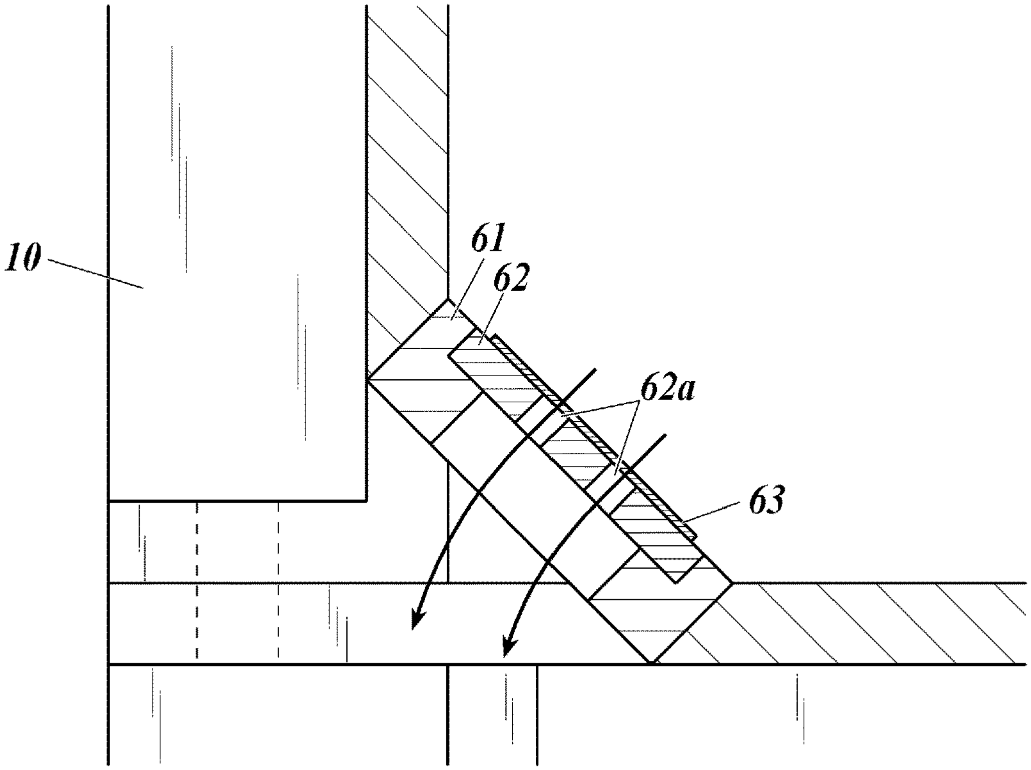
FIG. 3 is a partial cross sectional view in a direction perpendicular to an axis of the manufacturing device of the concrete pile according to an embodiment of the present invention and shows details of an outer formwork drain. A cross section without a magnet is shown.

The outer formwork drain 60 as shown in FIG. 3 includes a holder 61 and a perforated molding plate 62. The perforated molding plate 62 is held in the holder 61. The perforated molding plate 62 forms a molding surface which molds the outer wall surface of the concrete pile. Depending on the configuration, the holder 61 also forms the molding surface which molds the outer wall surface of the concrete pile. Alternatively, the holder 61 may not form the molding surface, that is, the holder 61 may not be exposed to the pile molding space S.

A drainage hole 62*a* is provided in the perforated molding plate 62. The drainage hole 62*a* is connected to the outside.

A water-permeable filter 63 is provided on a molding surface in which the drainage hole 62*a* of the perforated molding plate 62 is provided in order to cover the drainage hole 62*a*. By using the water permeable filter 63, clogging of the drainage hole 62*a* and the concrete attaching to the perforated molding plate 62 can be prevented. Therefore, it is possible to reduce the occasions of maintenance when the perforated molding plate 62 is repeatedly used, and productivity is enhanced. Moreover, by using the water permeable filter 63, it is possible to prevent or reduce traces of the drainage hole 62*a* being transferred on the concrete surface. Therefore, the concrete pile can be molded beautifully. The water permeable filter 63 is disposable and the water permeable filter 63 is exchanged with an unused filter each time. Therefore, the drainage properties are recovered swiftly. Moreover, service life of the perforated molding plate 62 is extended. Therefore, the productivity is enhanced while reducing necessity of maintenance and achieving low cost.

As described above, the formwork of the manufacturing device 100 is provided with drainage holes 62*a* distributed in four positions around the axis of the pile molding space S. The positions of the drainage holes 62*a* are distributed in order to ensure good drainage. Here, an 'axis_ of the pile molding space S is an axis line corresponding to the axis of the concrete pile molded in the pile molding space S.

According to the present embodiment, a cross section perpendicular to the axis direction of the pile molding space S is to be an octagonal cross section in a manner in which four corners of a rectangular cross section formed by the outer formwork main body 10 are cut out by short edges formed by the outer formwork drains 60. The octagon described above is an octagon in which a long edge and a short edge are connected alternately, and the drainage hole 62*a* is positioned in the short edge so as to distribute the drainage holes 62*a* in four positions.

The holder 61 is to be formed as one with the outer formwork main body 10 as a part of the outer formwork main body 10 and is to be fixed to the outer formwork main body 10 by welding.

The drainage hole 62*a* is not limited to the illustrated examples, and may be a shape spreading outward from the opening end on the molding surface. Further, the drainage can be further improved.

Figure 4:
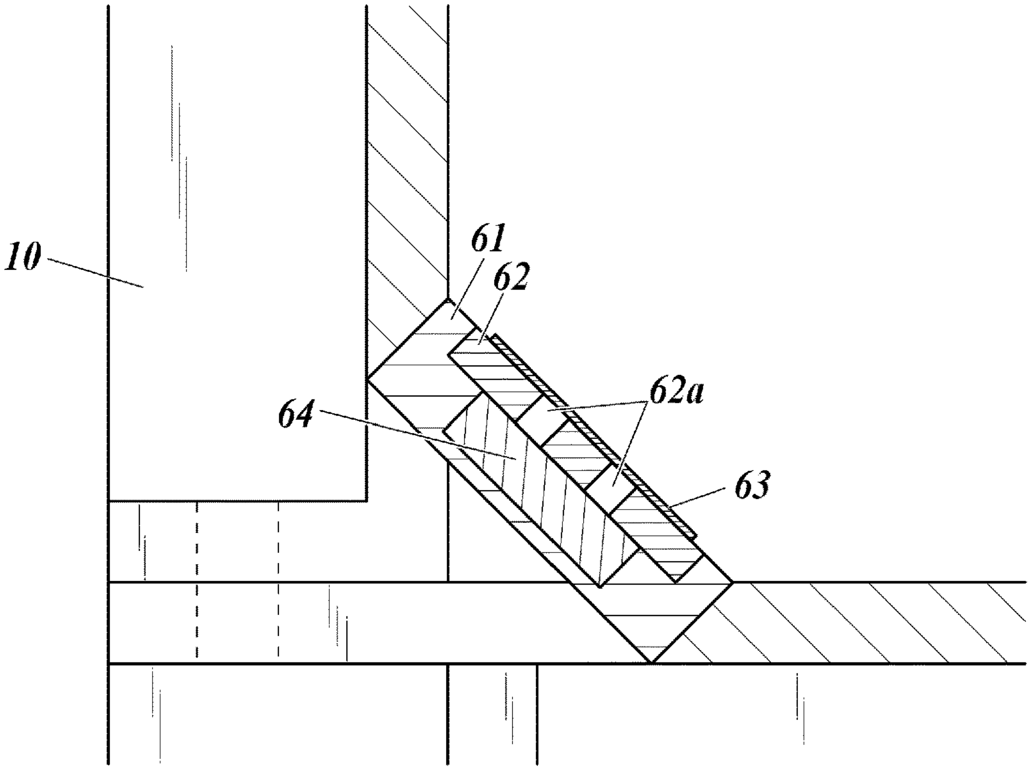
FIG. 4 is a partial cross section view perpendicular to the axis of the manufacturing device of the concrete pile according to an embodiment of the present invention and shows details of the outer formwork drain. A cross section with a magnet is shown.
Figure 5:
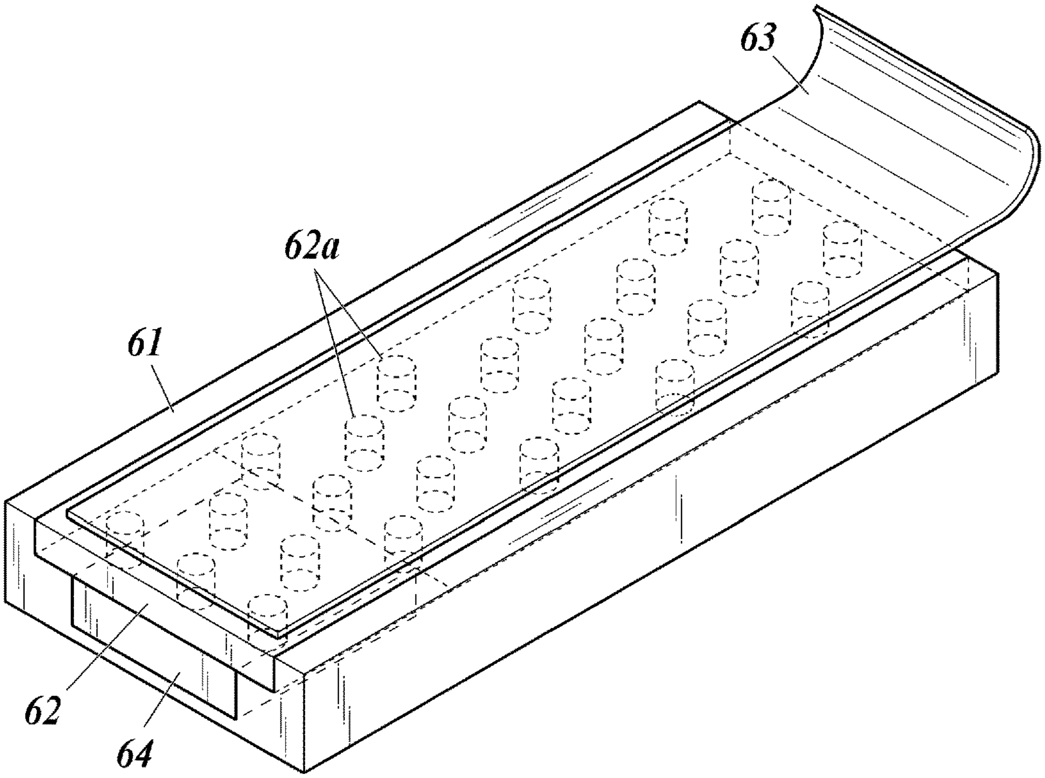
FIG. 5 is a perspective view showing details of the outer formwork drain which is a portion of the manufacturing device of the concrete pile according to an embodiment of the present invention.

The perforated molding plate 62 is included in the drainage hole 62*a* and the molding surface of the portion where the drainage hole 62*a* is provided. The perforated molding plate 62 is detachable from the holder 61. For example, the perforated molding plate 62 is formed with a material that can attach magnetically such as a steel plate. As shown in FIG. 4 and FIG. 5, the magnet 64 is fixed in predetermined positions of the holder 61. The perforated molding plate 62 can be held attached by magnetic force of the magnet 64 and can also be removed. By removing the perforated molding plate 62, cleaning and maintenance such as resolving the clogging of the drainage hole 62*a* can be easily performed. Moreover, after the pile is manufactured, the perforated molding plate 62 used at the time of manufacturing is replaced with a new or cleaned perforated molding plate 62. Therefore, it is possible to progress swiftly to the next pile manufacturing, and the maintenance time for the used perforated molding plate 62 can be secured. With this, the manufacturing efficiency is enhanced.

The position where the magnet 64 is provided is a few locations to ten or so locations (depending on the length) along a longitudinal direction of the holder 61 corresponding to the axis direction of the concrete pile. The space between the magnets 64 are open as drainage paths to drain the water outside from the drainage hole 62*a*.

Manufacturing Method

Next, a manufacturing method of the concrete pile using the manufacturing device 100 of the concrete pile is described.

First, a plurality of steel bars 1 (for example, 12 bars) are attached across the pair of metal joints 2.

The outer formwork main body 10 is assembled in a long square tube shape in an extending direction of the steel bar 1 in order to store the steel bar 1 fixed to the metal joints 2 inside.

The perforated molding plate 62 provided with the water-permeable filter 63 is attached to the holder 61 at the corner of the outer formwork main body 10 (see FIG. 3 and FIG. 4).

Next, one core 21 is inserted from the opening of one metal joint 2 and the other core 22 is inserted from the opening of the other metal joint 2. The piston rod 42 is linked to the other core 22, and the cylinder device 40 is attached to the core 22 side.

In substantially the middle between the pair of metal joints 2, the projecting portion 24 provided in the tip 22*a* of the other core 22 is inserted in the opening 23 provided in the tip 21*a* of the one core 21, and the pair of cores 21, 22 are assembled in a state in which the projecting portion 24 is inserted through the opening 23.

When the projecting portion 24 of the core 22 is inserted in the opening 23 of the core 21, the cylinder tube 41 of the cylinder device 40 attached to the other core 22 is inserted in the core 21. When the cylinder tube 41 reaches the predetermined position in the core 21, the linking pin 43 is operated by remote control and the cylinder tube 41 is linked to the core 21.

By linking the pair of cores 21, 22 through the cylinder device 40 as described above, it is possible to assemble the inner formwork 20 so that when the cylinder device 40 is operated, the tip 21*a* of one core 21 can be brought close to or separated from the tip 22*a* of the other core 22.

Next, the cushioning material 50 is placed between the metal joint 2 and the end formwork 30, and the end formwork 30 is fixed to both ends of the outer formwork main body 10. Here, the rear ends 21*b*, 22*b* of the cores 21, 22 included in the inner formwork 20 are also inserted in the concave portion 30*a* of the end formwork 30, and the end formwork 30 is assembled to the outer formwork main body 10.

In this way, the manufacturing device 100 to manufacture the concrete pile is assembled to be a state shown in FIG. 1A, FIG. 1B.

Next, the concrete is poured in from an input port (not shown) provided in the outer formwork main body 10, and the concrete is put into the pile molding space S which is between the pair of metal joints 2 and which is between the outer formwork main body 10 and outer drains 60, and the inner formwork 20. Here, the cylinder device 40 is operated, and the pair of cores 21, 22 are advanced and retreated so as to be close or separated. With this, preferably, fluidity of the concrete is promoted while filling in the pile molding space S with the concrete.

Then, after the pile molding space S is filled with a predetermined amount of concrete, the input port (not shown) is closed.

Figure 2:
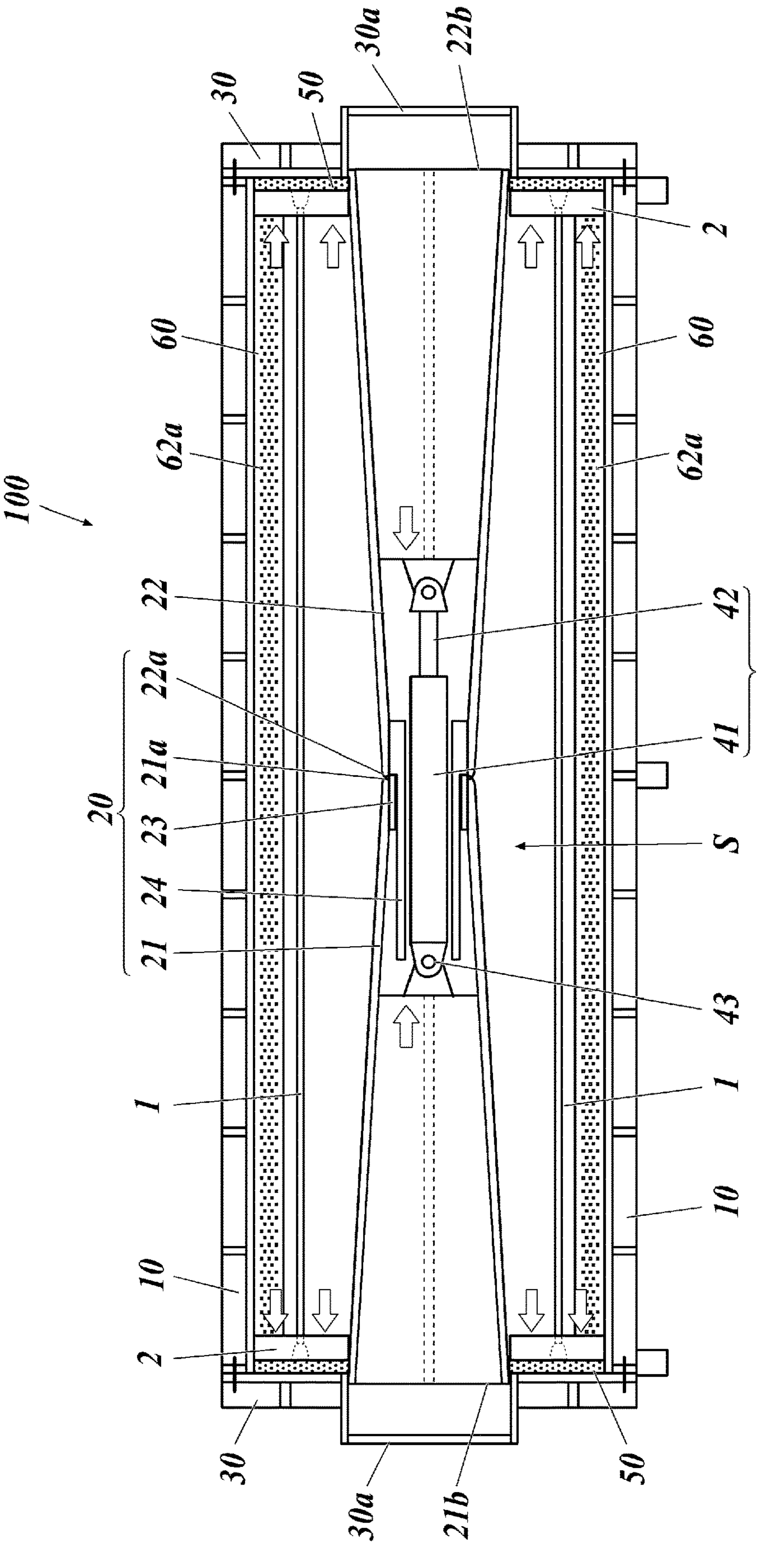
FIG. 2 is a cross sectional view in an axis direction showing a manufacturing device of a concrete pile according to an embodiment of the present invention and shows a state in which a pair of cores are pulled toward a center of the device.

Next, as shown in FIG. 2, the cylinder device 40 is operated so that the piston rod 42 is pulled into the cylinder tube 41. The tip 21*a* of one core 21 is brought close to the tip 22*a* of the other core 22.

The pair of cores 21, 22 in a tapered shape that becomes thinner toward the tips 21*a* and 22*a* are pulled toward the center side of the manufacturing device 100 so that the tips 21*a*, 22*a* are brought close to each other. Consequently, the pile molding space S in which the concrete is filled is compressed, the internal pressure in the pile molding space S is increased and the concrete is pressured. The water drained from the concrete is drained outside of the formwork from the drainage holes 62*a*.

Then, the pair of cores 21, 22 are held in a state pulled toward the center side of the device for a predetermined amount of time so that the internal pressure of the concrete in the manufacturing device 100 is a set value. Then, the concrete is hardened.

In FIG. 2, the illustration of the concrete filled in the pile molding space S is omitted.

Here, the step in which the pair of cores 21, 22 are held for a predetermined amount of time in a state in which the tips 21*a*, 22*a* are close to each other is described.

Wien the pair of cores 21, 22 are pulled toward the center side of the manufacturing device 100, the pile molding space S between the pair of metal joints 2 is compressed. Pressure is evenly applied to the concrete filled in the pile molding space S. Therefore, the metal joints 2 facing the pile molding space S are subjected to pressing force. With this, the pair of metal joints 2 are pressed in a direction to separate from each other, and the pair of metal joints are pressed toward the end formwork 30.

Here, the cushioning material 50 is placed between the metal joint 2 and the end formwork 30. Therefore, the extension of the steel bar 1 when the pair of metal joints 2 are each pressed toward the end formwork 30 is absorbed by the cushioning material 50, and the pretension is introduced to the steel bar 1.

By applying pressure to the concrete filled in the pile molding space S, pretension can be introduced to the steel bar 1. By applying pressure and holding the concrete for a predetermined amount of time to harden the concrete, prestress is introduced by the steel bar 1 introduced with pretention to the concrete after removing the concrete from the inner formwork 20.

The amount that the pair of cores 21, 22 is moved toward the center side of the manufacturing device 100 depends on excess water and air in the concrete. Therefore, by storing in advance the correlation of the blend of the concrete with relation to the change in the volume and the internal pressure of the concrete, it is possible to make adjustments so that the internal pressure of the concrete is a desired set value in a state in which the tips of the cores 21, 22 are in contact with each other.

If pressure is applied to the concrete and held to be hardened in a state in which the tips of the cores 21, 22 are in contact with each other, the hardened concrete is in contact with the tapered surface of the cores 21, 22. Therefore, it is easy to remove the inner formwork 20.

Next, the state in which the pair of cores 21, 22 are pulled toward the center side of the manufacturing device 100 is maintained. After pressure is applied to the concrete and the concrete is held in the manufacturing device 100 for a predetermined amount of time and the concrete is hardened, the cylinder device 40 is operated to press out the piston rod 42 from the cylinder tube 41, the tips 21*a*, 22*a* of the pair of cores 21, 22 are separated and moved, and the inner formwork 20 is removed.

After the end formwork 30 is removed, the linking pin 43 is operated by remote control, the cylinder tube 41 is removed from the core 21, and one core 21 and the other core 22 are each removed. Further, the outer formwork main body 10 is removed and the concrete pile is obtained.

Then, after wet curing at a high temperature such as covering individually with sheets and performing steamed curing, the removed concrete pile is completed.

By using the steel bar 1 introduced with the pretension as described above, the prestress is introduced to the concrete and it is possible to manufacture the prestressed concrete pile (PC pile).

In addition to the above-described pretension method, the PC pile in a post tension method can also be manufactured by the manufacturing device 100. When the post tension method PC pile is manufactured, the main points are as follows. Instead of the steel bar 1, a sheath and a PC steel material passing through the sheath are provided in the outer formwork main body 10 so as to make a connection between the pair of metal joints 2. Here, the PC steel material is provided so that each end of the PC steel material extends through a hole provided in the pair of metal joints 2. There is no necessity to provide the cushioning material 50. The other points are implemented similarly. After the concrete of the concrete pile with the mold removed hardens, tension is applied by pulling both ends of the PC steel material, and the prestress from the pair of metal joints 2 is introduced to the concrete. After the tension of the PC steel material, grout is injected in the sheath so that the concrete is formed as one with the PC steel material.

As described above, the manufacturing device 100 for manufacturing the concrete pile according to the present embodiment has a simple configuration, and the manufacturing device 100 can be easily provided or removed. Therefore, the manufacturing device 100 can be provided in a construction site, and the concrete pile can be manufactured in various construction sites by using ready mixed concrete and on-site mixed concrete.

If the concrete pile can be manufactured at the construction site, there is no need for large factory facilities. Moreover, the cost for conveying the heavy concrete pile from the factory to the construction site can be reduced. Therefore, product cost and construction cost can be reduced.

The manufacturing method using the above manufacturing device 100 for manufacturing the concrete pile does not need to perform centrifugal force molding or vibratory compaction as in conventional techniques. Therefore, there is no need to perform excess reinforcement of the formwork, the formwork is usually not damaged, and the maintenance is easy. Therefore, costs to maintain the manufacturing device 100 can be reduced, and the product cost and the construction cost can also be reduced. Further, there is no sound and no vibration, and there is no impact on the surrounding environment.

That is, according to the manufacturing method of the concrete pile using the manufacturing device 100 for manufacturing the concrete pile according to the present embodiment, it is possible to manufacture the concrete pile with low costs, and the construction can be performed at a low cost.

By employing in the manufacturing device 100 the inner formwork 20 including the pair of cores 21, 22 which are brought close and separated by the cylinder device 40, suitable pressure can be applied to the concrete filled in the pile molding space S in the manufacturing device 100. With this, the excess water and air included in the concrete can be drained well. Therefore, even if compaction by centrifugal force or vibration is not performed, dense concrete can be formed. Consequently, a concrete pile with large strength and high quality can be manufactured.

By providing the external formwork drain 60 in the corner of the external formwork main body 10 in the manufacturing device 100, the excess water in the concrete can be easily drained, and WC (water cement ratio) can be made smaller. Consequently, the strength of the concrete pile becomes stronger. Here, in the outer formwork drain 60, since the molding surface is formed with the perforated molding plate 62 provided with the drainage hole 62*a* in a configuring material such as a steel plate, there is no risk of deforming due to pressure applied in compression and molding, and the concrete pile can be molded accurately. Since the drainage hole 62*a* is connected outside, there is no risk of insufficient drainage, and the concrete pile can be manufactured with the desired WC (water cement ratio) and desired strength.

When the concrete is hardened, pressure is applied to the concrete by the cores 21, 22 of the inner formwork 20. The pressing force is applied to the pair of metal joints 2 in a direction of separation from each other. Since the pretension is introduced in the axis direction in the steel bar 1 fixed to the metal joints 2, the prestress is introduced in the concrete after being removed from the inner formwork 20.

Therefore, when the concrete pile is manufactured, there is no need to prepare special tools or a special device separately in order to introduce pretension in the steel bar 1. Consequently, it is possible to omit the burden necessary to introduce the pretension in the steel bar 1 in advance. That is, according to the manufacturing device 100 for manufacturing the concrete pile including the inner formwork 20 including the pair of cores 21, 22 which come close and separate by the cylinder device 40, the concrete pile can be manufactured with the prestress being introduced easily.

According to the above embodiment, the pair of cores 21, 22 are both moved by the cylinder device 40 so that the tips are pulled close to each other on the center side of the manufacturing device 100. However, the present invention is not limited to the above, and for example, one core 21 can be fixed to the end formwork 30 side, and the other core 22 can be moved by the operation of the cylinder device 40 so that the other core 22 is brought close to the one core 21.

The present invention is not limited to providing the cylinder device 40 on the tip side of the cores 21, 22, and for example, the cylinder device 40 can be provided at the rear end 21*b* of the core 21, and the piston rod 42 can penetrate to the rear end 22*b* of the other core to be linked. Alternatively, the cylinder device can be provided toward the side where each of the rear ends 21*b*, 22*b* of the cores 21, 22 are, and the cores 21, 22 can be pressed out toward the center side of the device. Further, the tips of the cores 21, 22 may be in contact in advance, and pressure may be applied by pump pressure when the concrete is poured in.

According to the present embodiment, the cushioning material 50 is provided between the metal joint 2 and the end formwork 30, and the pretension is introduced in the steel bar 1. If the cushioning material 50 is not provided between the metal joint 2 and the end formwork 30, tension may be provided on the steel bar 1 before the inner formwork 20 is removed, and the prestress can be introduced in the concrete after the mold is removed.

Outline of Embodiment 2

Various embodiments based on the above described embodiments are described below.

Figure 6:
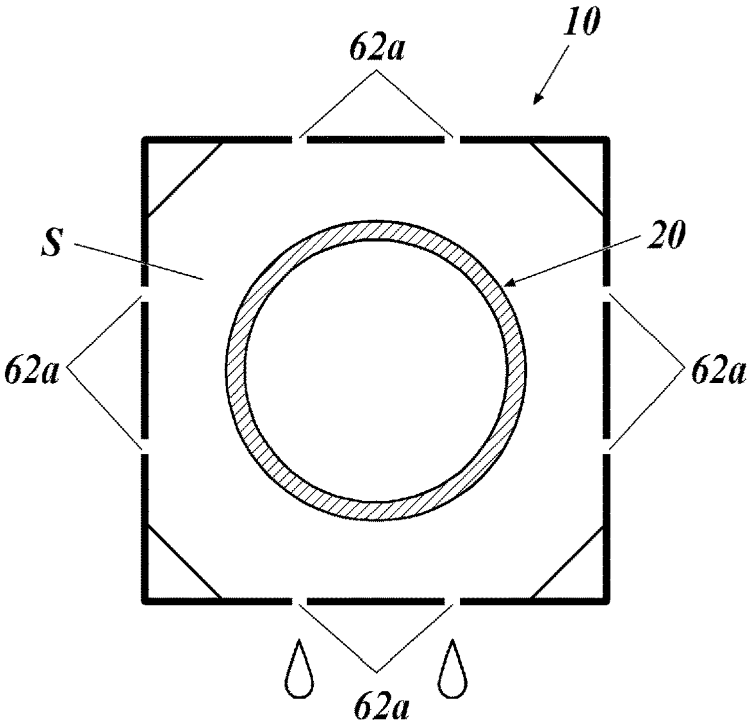
FIG. 6 is a schematic diagram showing a cross section perpendicular to the axis of the manufacturing device of the concrete pile according to another embodiment of the present invention.

(1) When the drainage hole 62*a* is provided on the molding surface which molds the outer wall surface of the concrete pile, the position can be selected freely. Instead of the corners, the drainage hole 62*a* can be provided on the plane with the largest area as shown in FIG. 6. In this case also, the water permeable filter that covers the drainage hole 62*a* can be provided.

Figure 7:
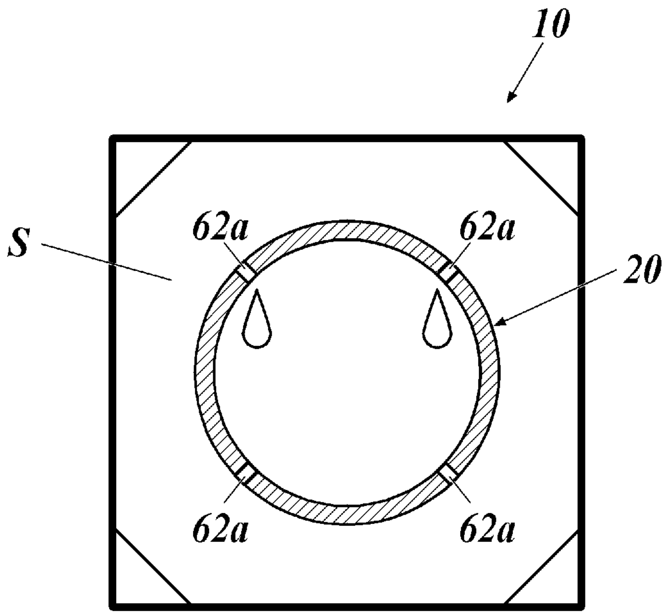
FIG. 7 is a schematic diagram showing a cross section perpendicular to the axis of the manufacturing device of the concrete pile according to another embodiment of the present invention.

(2) Moreover, in the formwork to be used, the drainage hole 62*a* may be provided in the molding surface which molds a hollow portion inner wall surface of the concrete pile as shown in FIG. 7. In this case also, the water permeable filter that covers the drainage hole 62*a* can be provided. Since it is not necessary to provide the drainage hole 62*a* on the molding surface which molds the outer wall surface of the concrete pile, when the trace of the drainage hole 62*a* remains on the concrete surface, it is possible to not expose the trace outside.

Notwithstanding the foregoing, the drainage hole 62*a* can be provided in both the molding surface which molds the outer wall surface of the concrete pile and the molding surface which molds the hollow portion inner wall surface of the concrete pile. The drainage will be good.

Figure 8:
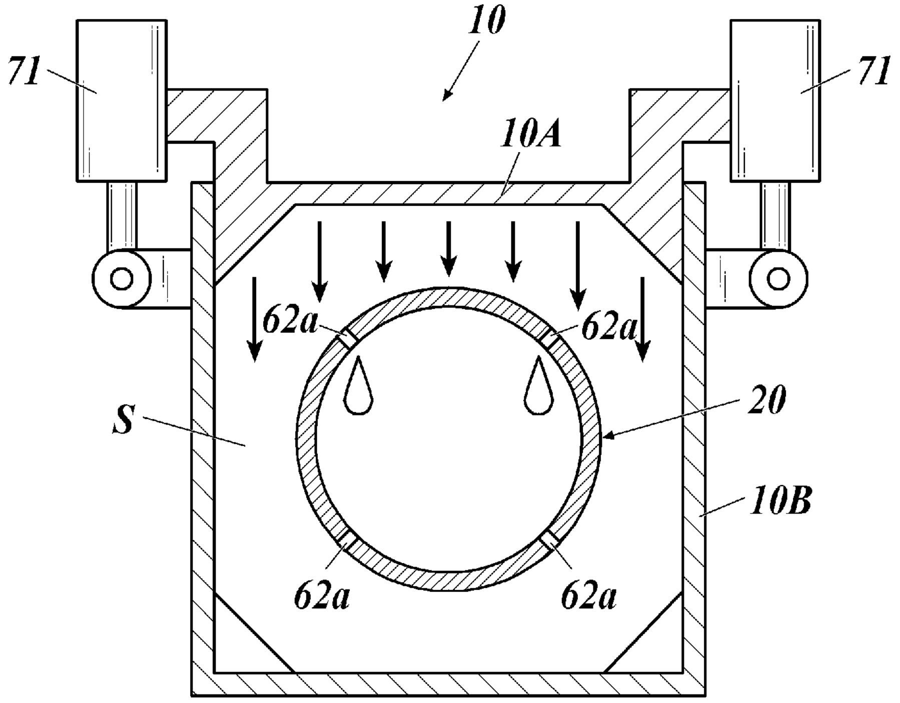
FIG. 8 is a schematic diagram showing a cross section perpendicular to the axis of the manufacturing device of the concrete pile according to another embodiment of the present invention.

(3) As shown in FIG. 8, it is possible to use the manufacturing device provided with a moving means 71 such as a cylinder device which slides a portion 10A of the outer formwork 10 against another adjacent portion 10*b* along a direction perpendicular to the axis direction of the pile molding space S, and the pile molding space S can be reduced or enlarged by the moving means 71. FIG. 8 shows the portion 10A which moves to be an upper surface in manufacturing, but the moving portion can be the surface of one side in manufacturing or can be the surface of both sides in manufacturing. Here, 'in manufacturing_ means the position that the concrete pile is placed to be horizontal when the concrete pile is manufactured.

The manner in which the moved portion 10A moves can be determined freely, and can be moved without tilting or moved while being tilted. With this, the cross section perpendicular to the axis direction of the concrete pile can be formed in various manners such as a square, rectangle, trapezoid, parallelogram or the like. Moreover, by also forming or by independently forming the link of the formwork members in a hinge configuration as described below (FIG. 26, FIG. 27), the shape of the cross section can be changed by the linked angle of the hinge, and the shape of the cross section can be easily formed in various manners.

Figure 9:
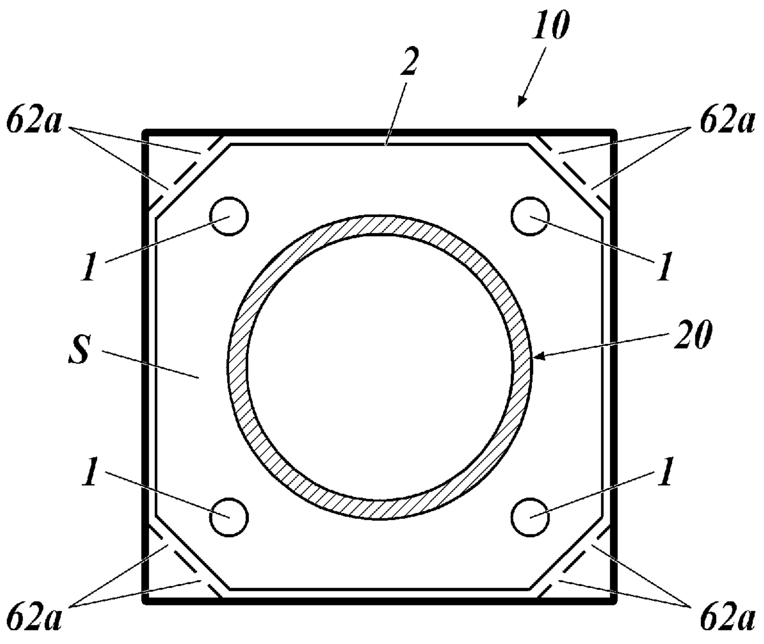
FIG. 9 is a schematic diagram showing a cross section perpendicular to the axis of the manufacturing device of the concrete pile according to another embodiment of the present invention.

(4) As described in FIG. 9, the steel bar 1 can be positioned distributed in four positions around the axis of the pile molding space S. For example, as shown in FIG. 9, the steel bar 1 can be limited to a total of 4 in the four corners, and be provided inside the concrete pile. Since the number of steel bars 1 can be suppressed, it is possible to shorten the time to perform the operation of positioning the steel bar 1.

Figure 10:
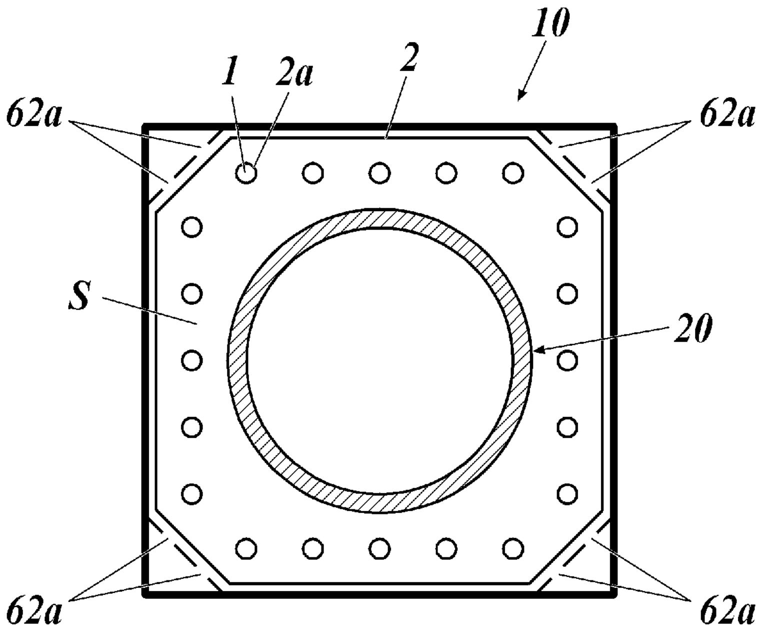
FIG. 10 is a schematic diagram showing a cross section perpendicular to the axis of the manufacturing device of the concrete pile according to another embodiment of the present invention.

(5) On the other hand, as shown in FIG. 10, the steel bar 1 can be provided in a number larger than 4.

The metal joint 2 includes a connection hole 2*a* of the steel bar 1, and the metal joints are manufactured to be two types or more with differences in one or two or more of the following, that is, the number of connection holes 2*a*, position, and internal diameter.

Then, one type is selected from the two or more types of metal joints, and the steel bar corresponding to the selected metal joint is selected and provided.

Consequently, the diameter, the number, and the position of providing the steel bar 1 can be easily selected.

(6) The entire length of the pile molding space S of the manufacturing device 100 does not have to be used.

A partition which partitions the pile molding space S in the axis direction is provided in any position of the pile molding space S in the axis direction, and the concrete is poured in one side or both sides of the partition. With this, the concrete pile can be manufactured with any length shorter than the length of the pile molding space S in the axis direction.

Figure 11:
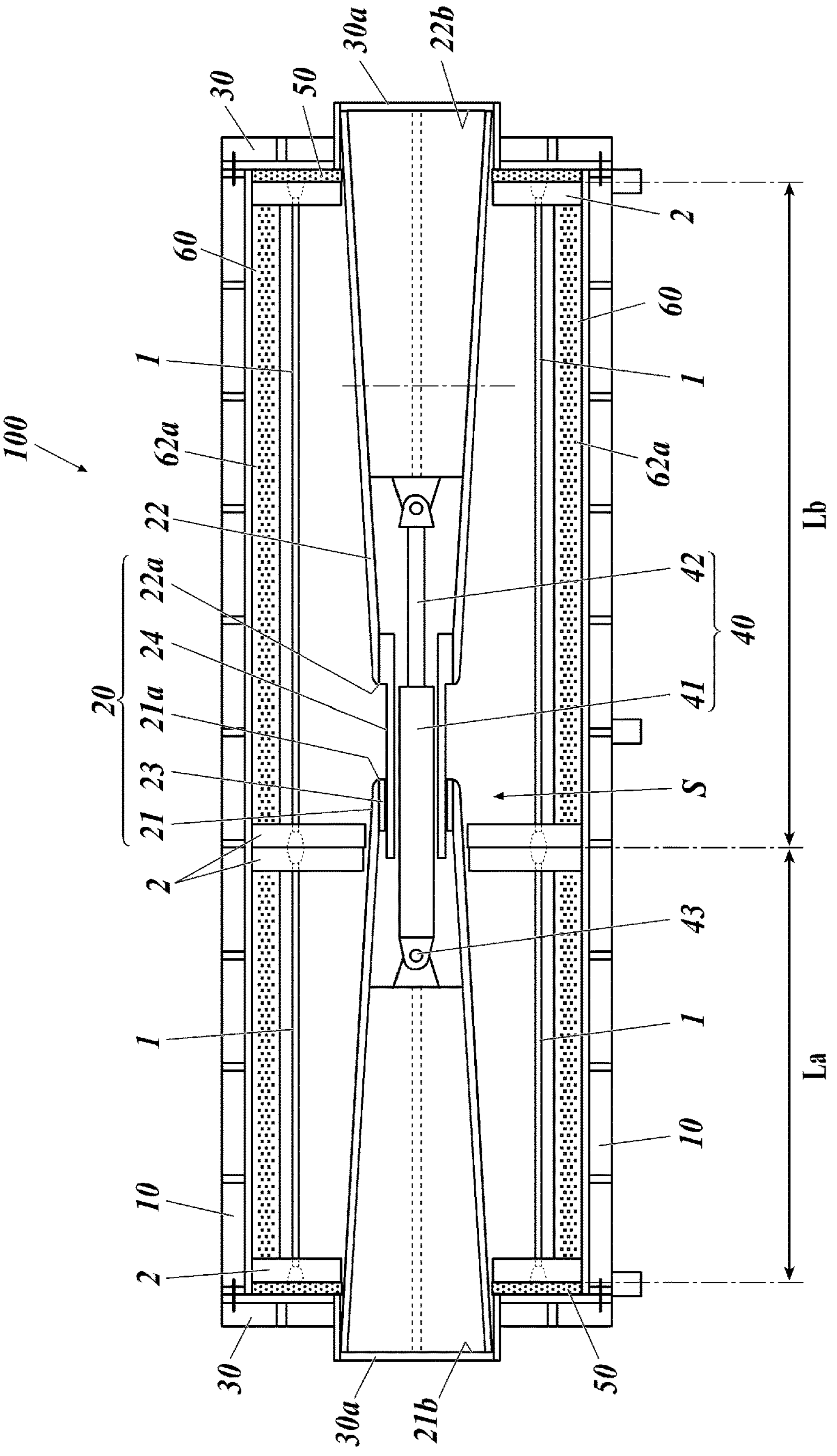
FIG. 11 is a cross section view in the axis direction of the manufacturing device of the concrete pile according to an embodiment of the present invention and shows manufacturing of two concrete piles in an arbitrary length shorter than a length in an axis direction of a pile molding space.

For example, as shown in FIG. 11, one set including the steel bar 1 and one pair of metal joints 2 fixed to both ends of the steel bar 1 may be provided in a range of the length La within the pile molding space S, and in the range of the length Lb, another set including another steel bar 1 and another pair of metal joints 2 fixed to both ends of the steel bar 1 may be provided. Then, the concrete can be filled and molded. With this, it is possible to manufacture the concrete pile with the length La and the concrete pile with the length Lb at the same time. If the metal joint 2 sufficiently functions as the partition, this is used as the partition. Other partitions can be inserted.

Figure 12:
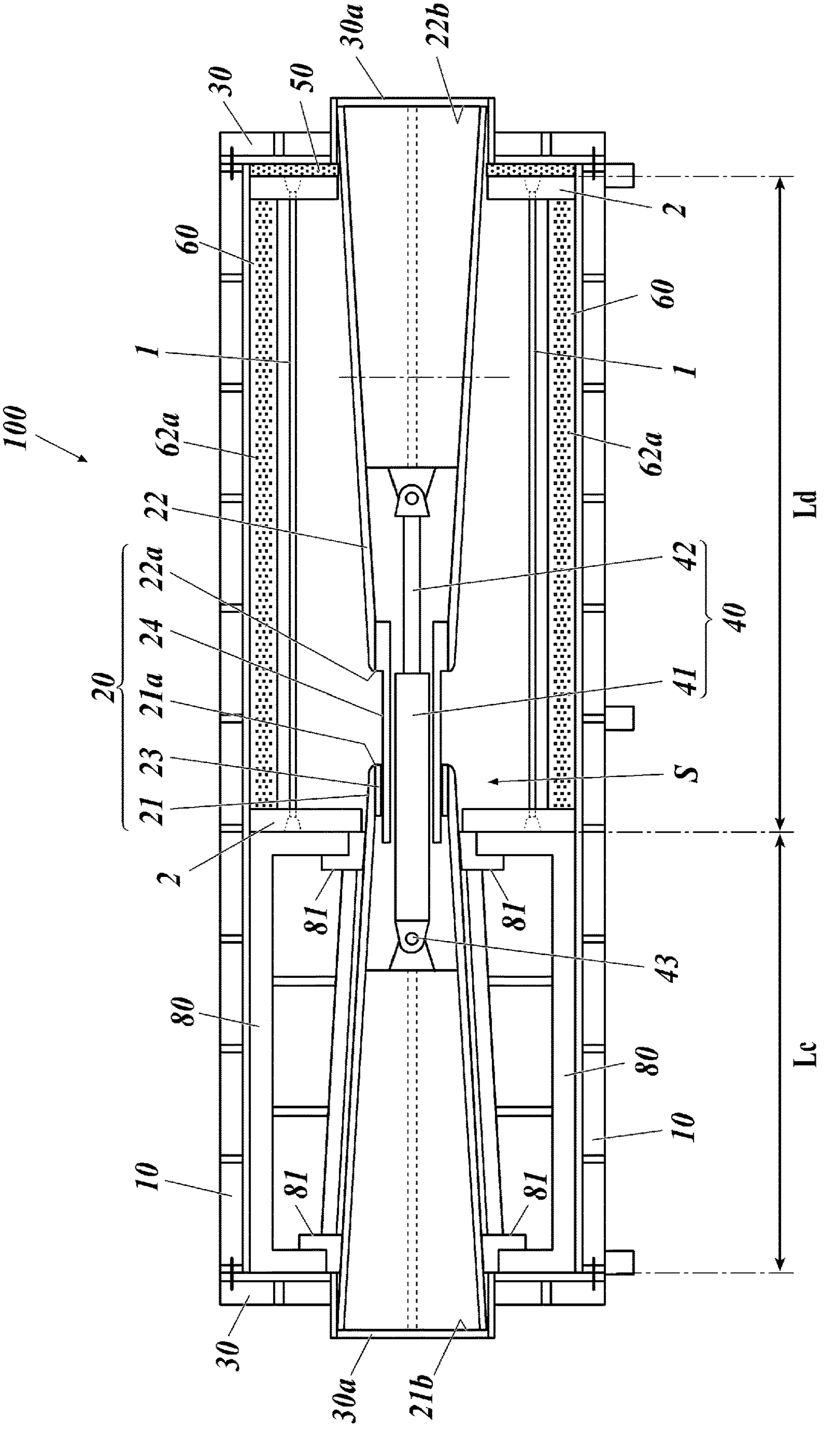
FIG. 12 is a cross section view in the axis direction of the manufacturing device of the concrete pile according to an embodiment of the present invention and shows manufacturing of one concrete pile in an arbitrary length shorter than a length in an axis direction of a pile molding space.

As shown in FIG. 12, by providing a mold box 80 in a space on one side in which concrete is not poured (corresponding to length Lc), the space on the side where the concrete is poured (corresponding to length Ld) can be easily held. In order to prevent leaking of the concrete, a sealing member (81) is suitably provided so that the cores 21, 22 are able to slide and the space can be sealed.

According to the above manufacturing method, the concrete pile with different lengths can be manufactured with one formwork, and there is no need to prepare formwork with different lengths. Moreover, it is possible to manufacture a plurality of concrete piles at once.

FIG. 11 and FIG. 12 describe the partition provided in one position and the pile molding space S divided into two. However, the partitions may be provided in two or more positions, and the molding space S can be divided into three or more.

(7) Slit-Shaped Drainage Hole

The above-described drainage hole 62*a* may be a slit-shaped drainage hole (slit) and the above embodiment can be similarly implemented.

Figure 13:
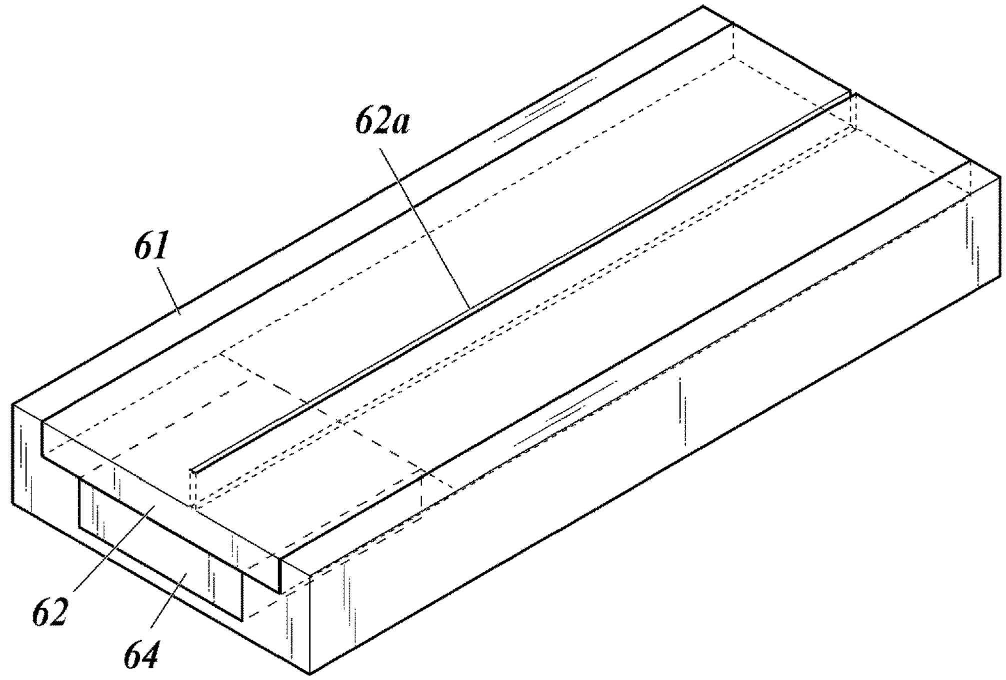
FIG. 13 is a perspective view showing in detail an outer formwork drain which is a portion of the manufacturing device of the concrete pile according to another embodiment of the present invention.

The example of forming the drainage hole 62*a* provided on the above-described perforated molding plate 62 to be a slit shape is shown in FIG. 13.

Figure 14:
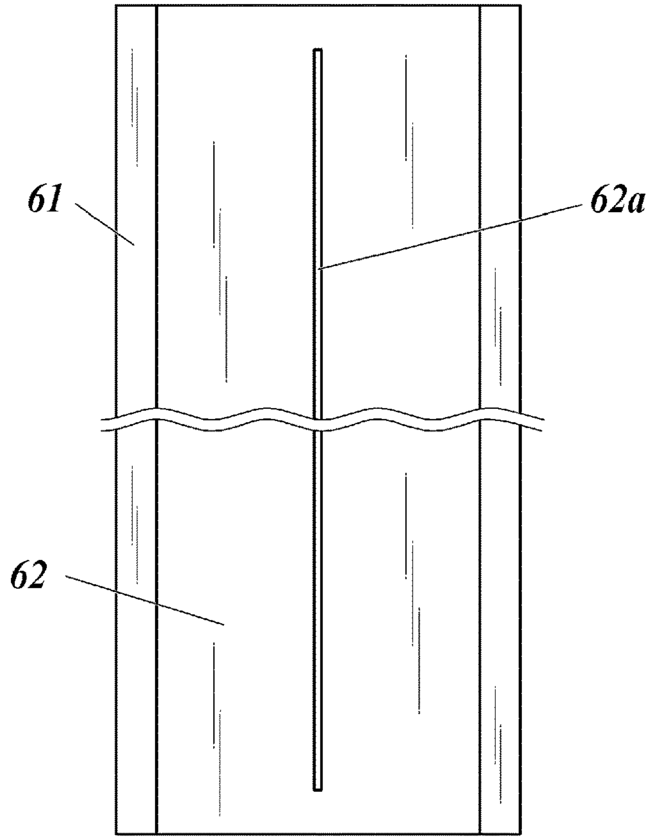
FIG. 14 is a plan view showing an example of an arrangement of a slit.

In the example shown in FIG. 13, the slit shaped drainage hole 62*a* is formed to be long in the longitudinal direction (axis direction) in the center of the perforated molding plate 62. FIG. 14 shows a plan view.

Figure 15:
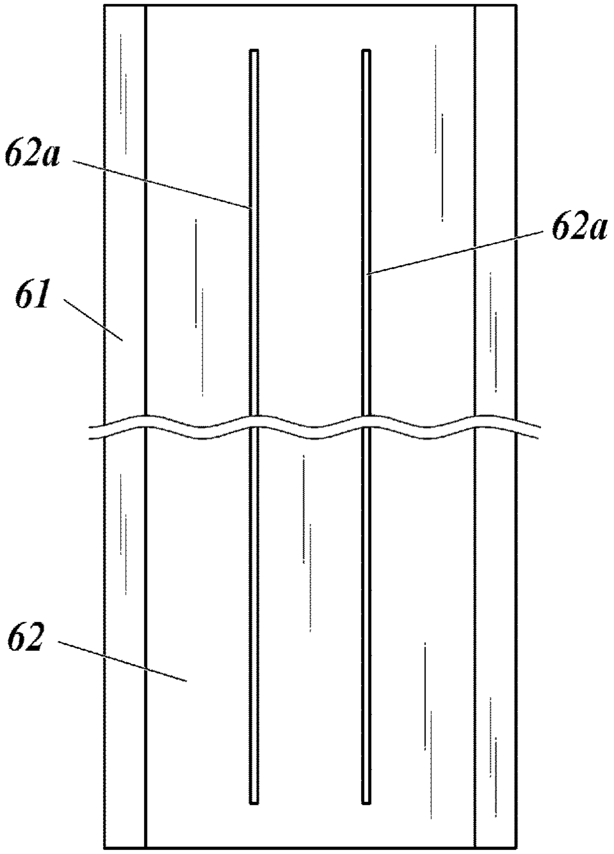
FIG. 15 is a plan view showing another example of an arrangement of slits.
Figure 16:
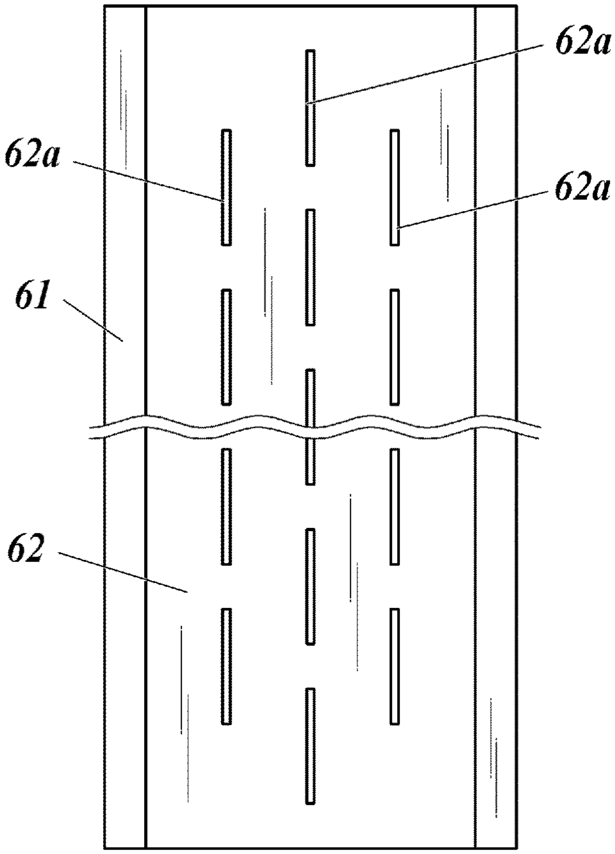
FIG. 16 is a plan view showing another example of an arrangement of slits.

FIG. 15 and FIG. 16 show another example. According to the example shown in FIG. 15, a plurality of slit shaped drainage holes 62*a*, 62*a* are provided in parallel. The number in parallel can be any number.

The slit shaped drainage hole 62*a* can be provided divided in a plurality of sections in the longitudinal direction. In the example shown in FIG. 16, the slit shaped drainage holes 62*a*, 62*a*, . . . are three rows offsetting the adjacent holes and the holes are divided into a plurality of sections in the longitudinal direction.

According to the above configuration, one slit shaped drainage hole 62*a* is configured with one component.

Figure 17:
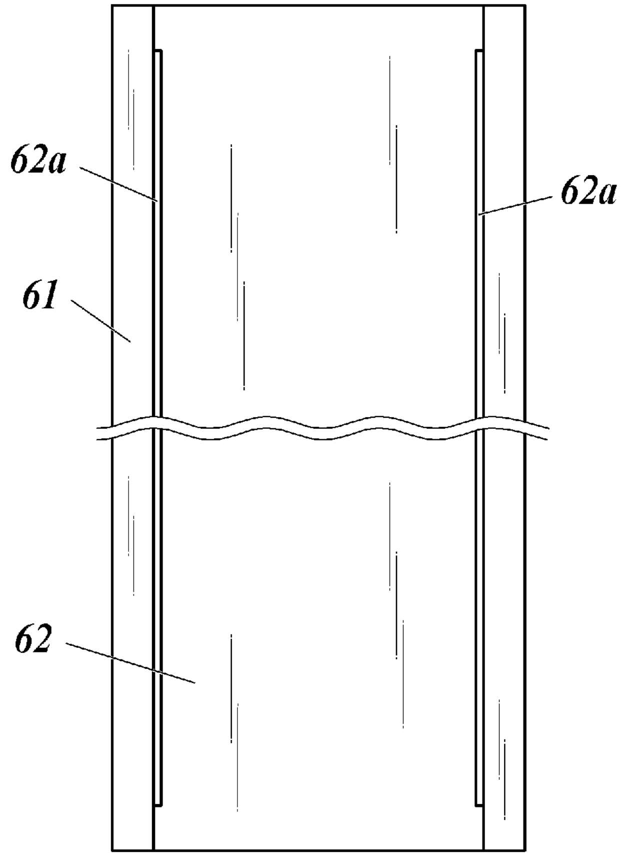
FIG. 17 is a plan view showing another example of an arrangement of slits.

One slit shaped drainage hole 62*a* may be configured with two or more components. For example, as shown in FIG. 17, a cutout portion is provided in the edge of the perforated molding plate 62, and the gap is formed between the perforated molding plate 62 and the holder 61. With this, the slit shaped drainage hole 62*a* can be configured. According to the example shown in FIG. 17, the slit can be divided into parts in the width direction of the slit.

By making the width of the slit shaped drainage hole 62*a* narrow, the concrete and the water can be sufficiently separated without using the water permeable filter 63. With this, the device configuration and the operation can be simplified.

By making the width of the slit shaped drainage hole 62*a* narrow, capillary action acts on the drainage holes 62*a*, and this provides drainage capability.

By making the length of the slit shaped drainage hole 62*a* long, the area of the drainage hole is secured to be large, and the sufficient drainage capability can be secured.

If the slit shaped drainage hole 62*a* is applied, compared to the round hole shown in FIG. 5, the capillary action occurs and the entire area of the drainage hole 62*a* in order to secure the necessary drainage capability can be made small. Compared to a round hole, since the entire area is small, the number of drainage holes 62*a* can be reduced. Moreover, the hole can be formed to be long in the axis direction. Therefore, compared to the round hole, the number of holes can be reduced greatly. If the number of drainage holes 62*a* is small and the total area is small, the cleaning process such as removing the clogging of the drainage hole 62*a* one by one can be made easy. Since the cleaning process becomes easy, the cleaning time becomes shorter, and it is possible to progress to the next manufacturing quickly. Therefore, one manufacturing cycle is shortened, and the productivity is enhanced.

As described above, if one slit shaped drainage hole 62*a* is composed of two or more components, the cleaning process may be performed by disassembling the unit, and the cleaning process becomes easier. If the slit can be divided in the width direction of the slit, the inside of the slit is largely opened by disassembling the unit. Therefore, the cleaning process becomes easier.

(8) Other Manufacturing Method

According to the above described manufacturing method, the pretension (tensile stress) on the tension material is introduced by contraction in the axis direction of the pair of cores 21, 22 and this is performed at the same time as the compression and molding of the concrete. However, there is a method to perform the introduction of the pretension on the tension material before the compression and molding of the concrete as described below.

The manufacturing device is to include the following configuration in addition to the configuration described above. FIG. 18 to FIG. 25 are diagrams viewed from above.

Figure 18:
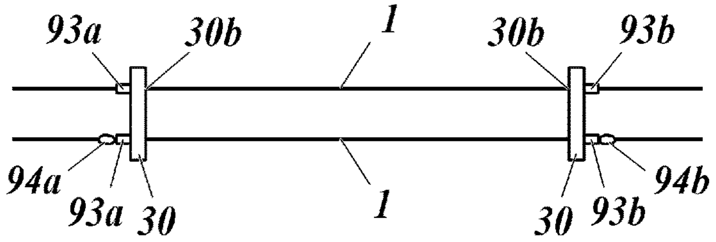
FIG. 18 is an upper view of a manufacturing facility to describe a manufacturing method of the concrete pile according to another embodiment of the present invention.

As shown in FIG. 18, the pair of end formwork 30, 30 include a hole 30*b* so that both ends of the tension material (steel bar 1) extending in the pile molding space S in the axis direction are able to penetrate and are able to extend to the outside of the end formwork 30.

Figure 19:
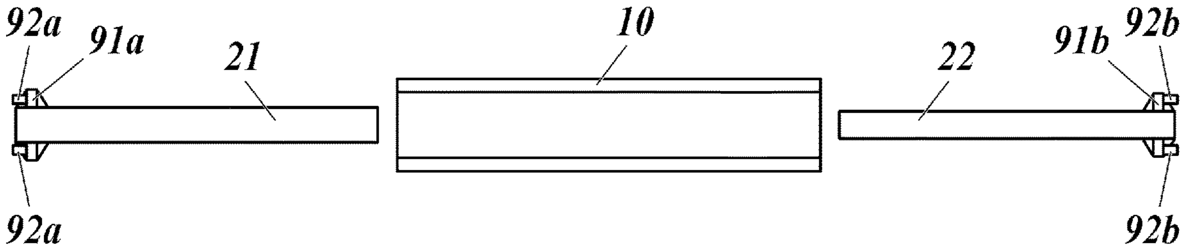
FIG. 19 is an upper view of a tension material and the manufacturing facility to describe a manufacturing method of the concrete pile according to another embodiment of the present invention.

First latching tools 91*a*, 92*a*, 91*b*, 92*b* which latch both ends of the tension material (steel bar 1) extending from the hole 30*b* as shown in FIG. 19, etc., to the pair of cores 21, 22 and second latching tools 93*a*, 93*b* which latch both ends of the tension material (steel bar 1) extending from the hole 30*b* as shown in FIG. 18, etc. to the pair of end formwork 30, 30 are provided.

The first latching tools 91*a*, 92*a*, 91*b*, 92*b* include flanges 91*a*, 91*b* fixed to the outer surroundings of the ends of the cores 21, 22, and fasteners 92*a*, 92*b* such as a nut or wedge type fasteners to fasten to the tension material (steel bar 1). The fasteners 93*a*, 93*b* such as the nut or the wedge type fastener fastening to the tension material (steel bar 1) are applied as the second latching tools 93*a*, 93*b*. The fasteners 92*a*, 92*b*, 93*a*, 93*b* are selected suitably according to the type of tension material. When the screw cannot be used, frictional fasteners such as wedge type fasteners may be used.

The cushioning material 50 (see FIG. 1A) provided in the above-described embodiments is not necessary in the present embodiment. The portion of the tension material (steel bar 1) which extends outside the end formwork 30 as shown in FIG. 18 is extended by adding other steel bars using couplers 94*a*, 94*b*, and the necessary length may be secured (no coupler in FIG. 20 to FIG. 25). The portion which is not embedded in the concrete pile can be kept short. The coupler and the other steel bar used for extending can be used repeatedly. An unnecessary jumped out portion of the tension material (steel bar 1) which is cut out as described later decreases, and the manufacturing cost of the concrete pile can be decreased.

Figure 20:
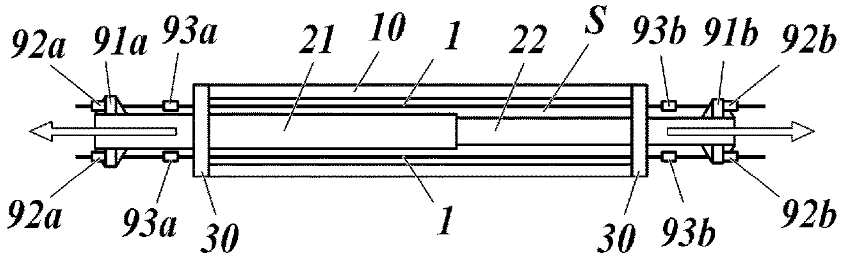
FIG. 20 is an upper view of a manufacturing scene to describe a manufacturing method of the concrete pile according to another embodiment of the present invention.

The manufacturing process is as described below. As shown in FIG. 20, the outer for formwork 10 (excluding the upper lid 10*u*), the inner formwork 20 (see FIG. 1A) and the end formwork 30 are assembled to form the four sides and the bottom surface of the pile molding space S, and the tension material (steel bar 1) extending in the axis direction of the pile molding space S is stored in the pile molding space S. The pair of metal joints 2 are stored in the pile molding space as necessary, and the illustration is omitted. The end formwork 30, 30 and the necessary number of tension material (steel bar 1) can be assembled in advance as shown in FIG. 18.

One of the ends of the tension material (steel bar 1) is latched to the core 21 with the first latching tools 91*a*, 92*a*, and the other end is latched to the core 22 with the first latching tools 91*b*, 92*b*.

As described above, by using the first latching tools 91*a*, 92*a*, 91*b*, 92*b* and by using the moving member (cylinder device 40), the pair of cores 21, 22 are extended in the axis direction. The pile molding space S is enlarged and the tensile stress is generated in the tension material (steel bar 1). This state is FIG. 20.

Figure 21:
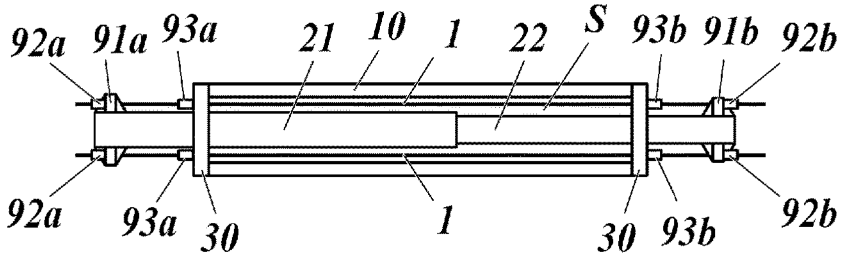
FIG. 21 is an upper view of a manufacturing scene after FIG. 20.

Next, the tension material (steel bar 1) is restrained in a state with the tensile stress by the outer formwork main body 10 and the end formwork 30, 30. The second latching tools are used for the above. As shown in FIG. 21, the fasteners 93*a*, 93*b* of the second latching tool are fastened to the tension material (steel bar 1), and the latching tools 93*a*, 93*b* are pressed to the outer surface of the end formwork 30, 30.

Figure 22:
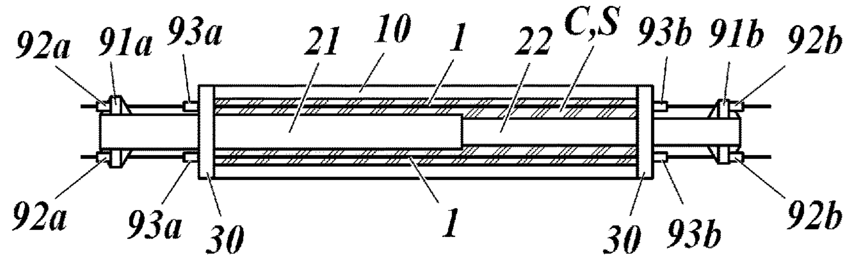
FIG. 22 is an upper view of a manufacturing scene after FIG. 21.

Next, the concrete C is put in the pile molding space S as shown in FIG. 22.

Figure 23:
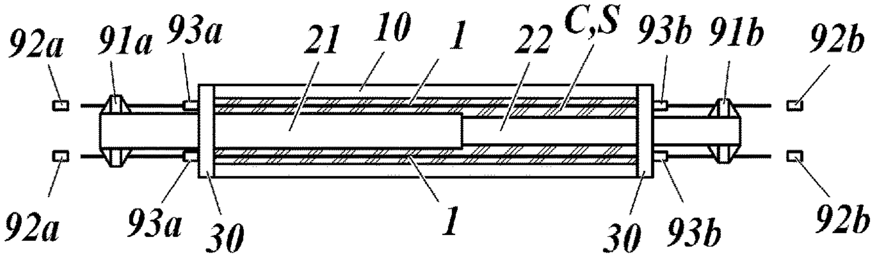
FIG. 23 is an upper view of a manufacturing scene after FIG. 22.

Next, the fasteners 92*a*, 92*b* of the first latching tool are removed from the tension material (steel bar 1) as shown in FIG. 23. The upper lid 10*u* of the outer formwork main body 10 is assembled and the mold is tightened.

Figure 24:
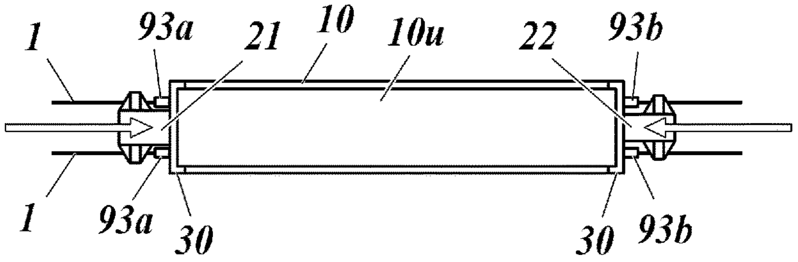
FIG. 24 is an upper view of a manufacturing scene after FIG. 23.

The subsequent concrete molding process is similar to the above described manufacturing method. That is, by using the moving member (cylinder device 40) as shown in FIG. 24, the pair of cores 21, 22 are contracted in the axis direction and the pile molding space S is reduced. The concrete C is compressed and molded, and the water drained from the concrete by the compression and molding is drained outside of the formwork from the drainage hole 62*a*. After holding for a predetermined amount of time in a state with tensile stress in the tension material (steel bar 1), the concrete C is hardened.

Figure 25:
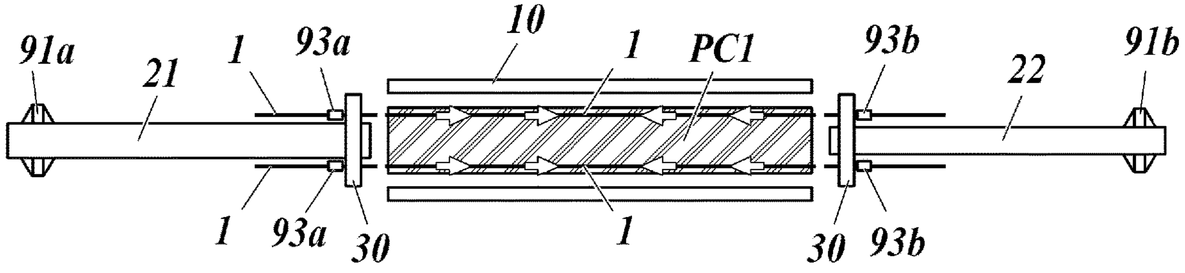
FIG. 25 is an upper view of a manufacturing scene after FIG. 24.

After the concrete C is hardened, the mold is removed as shown in FIG. 25, and pressurized prestressed concrete pile PC1 is taken out. By loosening the fasteners 93*a*, 93*b*, the end formwork 30, 30 can be detached, and the unnecessary portions that jump out from the tension material (steel bar 1) are cut out.

According to the above manufacturing method, the expansion and contraction functions of the cores 21, 22 are used effectively to suppress the configuration of the machine from becoming large, and the introduction step of the pretension (tensile stress) on the tension material can be performed independent from the compression and molding step of the concrete. Therefore, it is possible to manufacture a pressurized prestressed concrete pile with a desired pretension such as high pretension. The expansion and contraction of the cores 21, 22 which are common machine functions are used for controlling independently the compressed state of the concrete and the degree of the pretension of the tension material.

According to the above described embodiment, the cross section shape perpendicular to the axis direction of the outer formwork main body 10 is a rectangle, and the cross section shape perpendicular to the axis direction of the pile molding shape S is an octagon. The present invention is not limited to the above, and the shape of the cross section can be any shape. For example, the cross section shape of the outer formwork main body 10 may be a circle, that is, the pile molding space S may be a cylinder. The perforated molding plate may be a curved plate fitted in a portion of the outer circumferential surface of the cylinder. Similarly, the cross section shape of the cores 21, 22 may be any shape.

The technique of the present invention is not limited to manufacturing the PC pile as the concrete pile, and steel bars can be used as reinforcing material to be applied to manufacturing of reinforced concrete pile (RC pile).

According to the present embodiment, the slit shaped drainage holes 62*a* are formed in the perforated molding plate 62 or between the perforated molding plate 62 and the holder 61. However, the slit shaped drainage holes 62*a* may be provided in various positions of the outer formwork main body 10, the inner formwork 20, and the end formwork 30.

Figure 26:
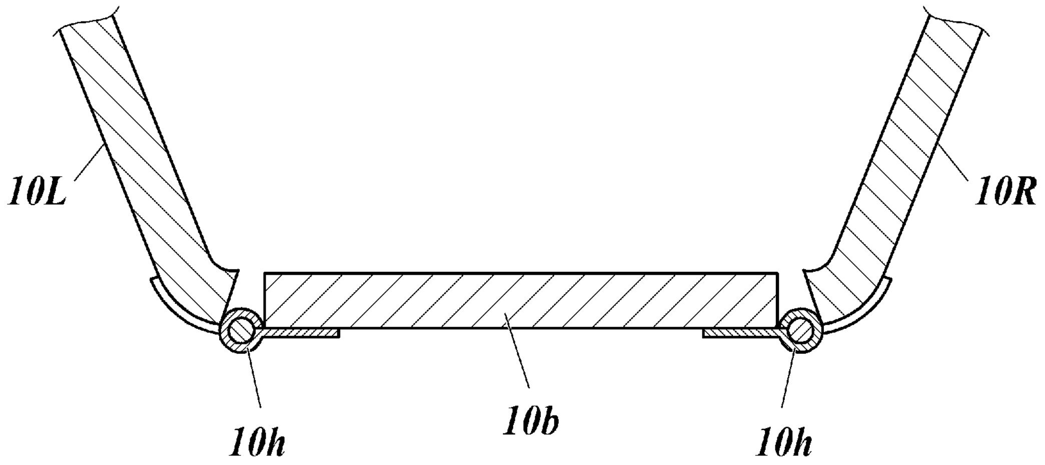
FIG. 26 is a cross section view of an outer formwork main body which is a portion of the manufacturing device of the concrete pile according to another embodiment of the present invention, and shows an open state.
Figure 27:
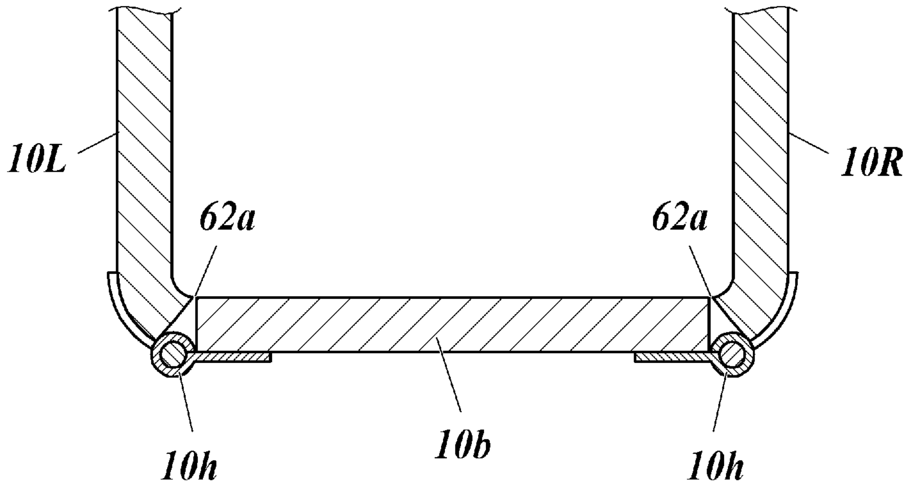
FIG. 27 is a cross section view of an outer formwork main body which is a portion of the manufacturing device of the concrete pile according to another embodiment of the present invention, and shows a closed state.

As shown in FIG. 26 and FIG. 27, the gap between the bottom surface portion 10*b* of the outer formwork main body 10 and the side surface portions 10L, 10R can be the slit shaped drainage hole 62*a*.

In this case, the formwork member bottom surface portion 10*b* and the formwork member side surface portions 10L, 10R can be opened and closed by the hinge link. As shown in FIG. 27, when the mold is tightened, the slit shaped drainage hole 62*a* is a predetermined gap size and is able to function as the drainage hole. The slit shaped drainage hole 62*a* in this case is repeated a predetermined dimension in the axis direction. The portion where the slit is not provided is to be a configuration where the members come into contact with each other. When the mold is opened as shown in FIG. 26, the inside of the slit shaped drainage hole 62*a* is also largely opened, and the cleaning becomes easy. The special component to provide the drainage hole such as the perforated molding plate 62 becomes unnecessary, and the configuration of the formwork becomes simple.

Although not shown, a gap can be formed between the upper lid 10*u* and the side surface portions 10L, 10R and this can be the slit shaped drainage hole. In this case, the upper lid 10*u* is linked with a hinge to one side surface portion 10L or 10R, and the embodiment can be similarly implemented by allowing the upper lid 10*u* to be able to open and close.

The link among the components of the outer formwork 10 such as the upper lid 10*u*, the side surface portions 10L, 10R, and the bottom portion 10*b* do not have to be a link with a hinge. When the outer formwork 10 is assembled and the mold is tightened, a gap may remain in a slit shape between the adjacent components, and the gap may be the slit shaped drainage hole 62*a*.

INDUSTRIAL APPLICABILITY

The present invention can be used in the manufacturing of concrete piles.

REFERENCE SIGNS LIST

1 steel bar
2 metal joint
2*a* connection hole
10 outer formwork main body
20 inner formwork
21, 22 core
30 end formwork
40 cylinder device
41 cylinder tube
42 piston rod
43 linking pin
50 cushioning material
60 outer formwork drain
61 holder
62 perforated molding plate
62*a* drainage hole
63 water permeable filter
64 magnet
71 moving member
100 manufacturing device
S pile molding space

The invention claimed is:

1. A manufacturing method of a concrete pile that uses a formwork in which a drainage hole connected to outside is provided on a molding surface and in which a pile molding space can be reduced and enlarged, the method comprising:

pouring concrete in the pile molding space, reducing the pile molding space to compress and mold the concrete, draining water drained from the concrete by compression and molding outside of the formwork from the drainage hole, and holding the concrete a predetermined amount of time to harden the concrete, wherein, the formwork includes an outer formwork that molds an outer wall surface of the concrete pile, an inner formwork that molds an inner wall surface of a hollow space of the concrete pile, and a pair of end formwork that mold upper and lower end surfaces of the concrete pile, the outer formwork includes a plurality of components that are linked with a hinge, the drainage hole is a slit shape, the drainage hole is a gap between the adjacent components when the mold is tightened, and the gap is configured to be capable of being opened larger during cleaning than when the mold is tightened, an inner side surface of the drainage hole is opened toward an inner surface side of the outer formwork when the components linked with the hinge are opened, the inner formwork includes a pair of cores each including a tapered surface which shrinks in diameter toward a tip along an axis direction of the pile molding space and the tips are positioned to face each other, the end formwork is configured to be capable of supporting a rear end of the pair of cores in a slidable manner, a cylinder device slides at least one core along the axis direction and brings close and separates the tips of the pair of cores, and wherein the cylinder device includes a cylinder tube and a piston rod and is configured to be capable of reducing and enlarging the pile molding space, the pair of end formwork include a hole through which both ends of a tension material extending in the axis direction in the pile molding space are able to penetrate and are able to extend outside of the end formwork, a flange and a first fastener latches both ends of the tension material extending from the hole to the pair of cores, and a second fastener that latches both ends of the tension material extending from the hole to the pair of end formwork, in addition to using the flange and the first fastener, the cylinder device is used to extend the pair of cores in the axis direction, the pile molding space is enlarged, and tensile stress can be created in the tension material, and the second fastener is configured to be capable of being used to constrain the tension member in a state that tensile stress is created by the outer formwork and the end formwork.

2. The manufacturing method of the concrete pile according to claim 1, wherein, the drainage hole is a shape that spreads outside from an opening end on the molding surface.

3. A manufacturing device of a concrete pile comprising:

a formwork that compresses and molds the concrete pile, and a drainage hole that is provided in a molding surface of the formwork and that is connected to outside, wherein, the formwork is configured to be capable of reducing and enlarging a pile molding space and the concrete pile is compressed and molded, wherein, the formwork includes an outer formwork that molds an outer wall surface of the concrete pile, an inner formwork that molds an inner wall surface of a hollow space of the concrete pile, and a pair of end formwork that mold upper and lower end surfaces of the concrete pile, the outer formwork includes a plurality of components that are linked with a hinge, the drainage hole is a slit shape, the drainage hole is a gap between the adjacent components when the mold is tightened, and the gap is configured to be capable of being opened larger during cleaning than when the mold is tightened, an inner side surface of the drainage hole is opened toward an inner surface side of the outer formwork when the components linked with the hinge are opened, the inner formwork includes a pair of cores each including a tapered surface which shrinks in diameter toward a tip along an axis direction of the pile molding space and the tips are positioned to face each other, the end formwork is configured to be capable of supporting a rear end of the pair of cores in a slidable manner, the device further comprises a cylinder device that slides at least one core along the axis direction and brings close and separates the tips of the pair of cores, and wherein the cylinder device includes a cylinder tube and a piston rod and is configured to be capable of reducing and enlarging the pile molding space, the pair of end formwork include a hole through which both ends of a tension material extending in the axis direction in the pile molding space are able to penetrate and are able to extend outside of the end formwork, the device further comprises a flange and a first fastener that latches both ends of the tension material extending from the hole to the pair of cores, and a second fastener that latches both ends of the tension material extending from the hole to the pair of end formwork, in addition to using the flange and the first fastener, the cylinder device is used to extend the pair of cores in the axis direction, the pile molding space is enlarged, and tensile stress can be created in the tension material, and the second fastener is configured to be capable of being used to constrain the tension member in a state that tensile stress is created by the outer formwork and the end formwork.

4. The manufacturing device of the concrete pile according to claim 3, wherein, the drainage hole is a shape that spreads outside from an opening end on the molding surface.

* * * * *